US012518726B2

(12) United States Patent
Pinson

(10) Patent No.: US 12,518,726 B2
(45) Date of Patent: Jan. 6, 2026

(54) TRANSPORTABLE STRINGED KEYBOARD INSTRUMENT

(71) Applicant: Keybird Instruments ApS, Copenhagen S (DK)

(72) Inventor: Lander Pinson, Copenhagen (DK)

(73) Assignee: Keybird Instruments ApS, Copenhagen S (DK)

( * ) Notice: Subject to any disclaimer, the term of this patent is extended or adjusted under 35 U.S.C. 154(b) by 372 days.

(21) Appl. No.: 17/759,811

(22) PCT Filed: Feb. 2, 2021

(86) PCT No.: PCT/DK2021/050032

§ 371 (c)(1),
(2) Date: Jul. 29, 2022

(87) PCT Pub. No.: WO2021/151449

PCT Pub. Date: Aug. 5, 2021

(65) Prior Publication Data

US 2023/0127612 A1 Apr. 27, 2023

(30) Foreign Application Priority Data

Feb. 2, 2020 (DK) ............................. PA202000128

(51) Int. Cl.
*G10C 1/02* (2006.01)
*G10C 3/04* (2006.01)
(Continued)

(52) U.S. Cl.
CPC ................. *G10C 1/02* (2013.01); *G10C 3/04* (2013.01); *G10C 3/06* (2013.01); *G10C 3/161* (2013.01)

(58) Field of Classification Search
CPC ... G10C 1/02; G10C 3/04; G10C 3/06; G10C 3/161; G10C 1/00
See application file for complete search history.

(56) References Cited

U.S. PATENT DOCUMENTS 1,157,047 A 10/1915 Rowntree
1,490,678 A 4/1924 Felix
(Continued)

FOREIGN PATENT DOCUMENTS

GB 178251 A 4/1922
GB 419608 A 11/1934
(Continued)

OTHER PUBLICATIONS

International Search Report and Written Opinion, dated Dec. 6, 2021, 21 pages, issued in International Application No. PCT/DK2021/050032.

*Primary Examiner* — Kimberly R Lockett
(74) *Attorney, Agent, or Firm* — AVEK IP, LLC

(57) ABSTRACT

A transportable stringed keyboard instrument includes a lightweight sound-body formed of several layers with front plate and back plate of material of high modulus of elasticity like steel or higher, with a side plate of a material of high modulus of elasticity like steel or higher, bonded to various layers between front plate and back plate. A method of forming a lightweight sound-body includes a single press procedure, wherein the sound-body is formed with bending in opposite direction compared to bending forces due to the string load. An upright piano action is optimized for space reduction so that keys can be positioned closer to the strings and a rotatable action together with the keys form a separate unit for transportation, apart from the sound-body.

19 Claims, 5 Drawing Sheets

(51) Int. Cl.
*G10C 3/06* (2006.01)
*G10C 3/161* (2019.01)

(56) References Cited

U.S. PATENT DOCUMENTS

| | | | |
|---|---|---|---|
| 1,758,972 | A | 5/1930 | William |
| 1,794,783 | A | 3/1931 | Waldemar |
| 2,058,001 | A | 10/1936 | Colwin et al. |
| 2,174,671 | A | 10/1939 | Joseph |
| 2,351,497 | A | 6/1944 | Fomeen |
| 2,760,398 | A | 8/1956 | Knud |
| 3,146,658 | A | 9/1964 | Mandy et al. |
| 4,254,684 | A | 3/1981 | Helpinstill, III |
| 4,377,102 | A | 3/1983 | Mayerjak |
| 4,641,565 | A | 2/1987 | Tachida et al. |
| 5,339,717 | A | 8/1994 | Vagias |
| 6,133,519 | A | 10/2000 | Mair |
| 2022/0221749 | A1* | 7/2022 | Wu ........................ H10K 50/86 |

FOREIGN PATENT DOCUMENTS

| | | | |
|---|---|---|---|
| GB | 599402 | A | 3/1948 |
| GB | 2161972 | A | 1/1986 |
| JP | S58224384 | A | 12/1983 |

* cited by examiner

Fig. 1
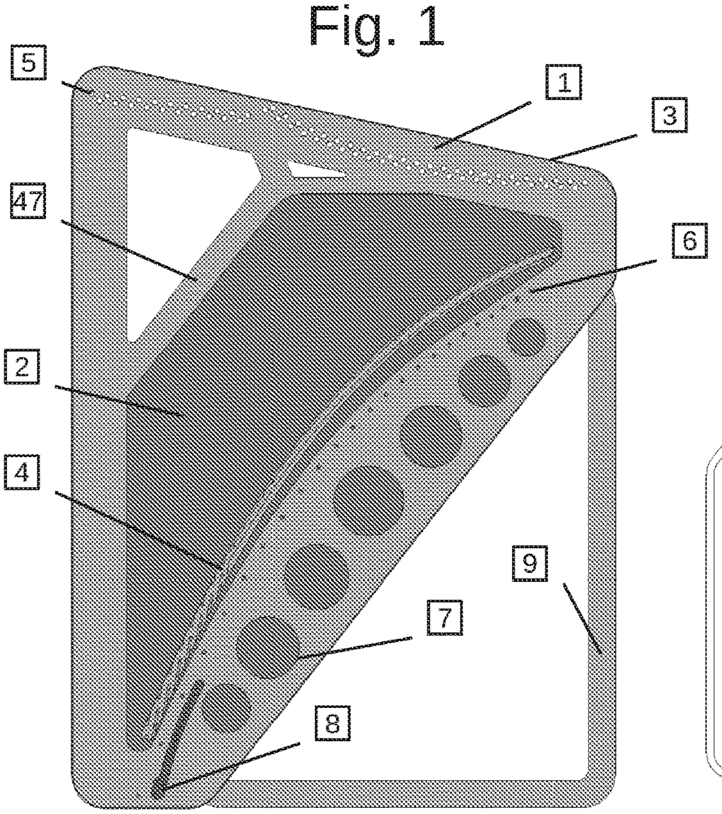
Fig. 15
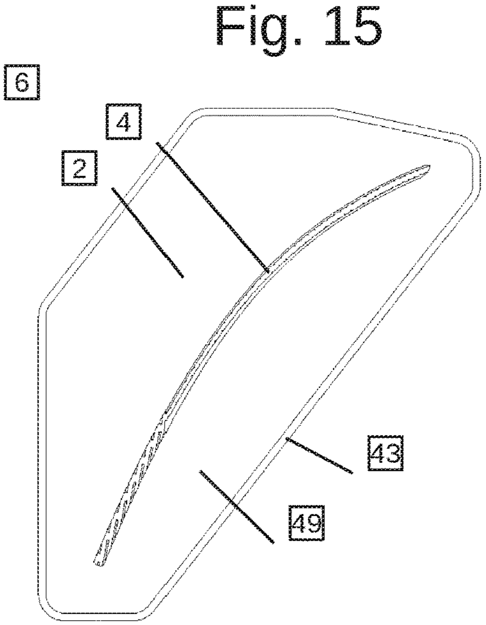
Fig. 2
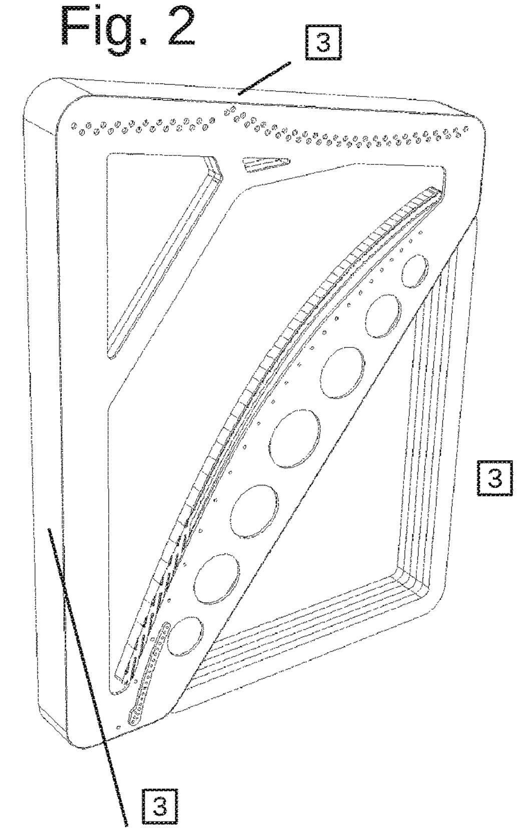
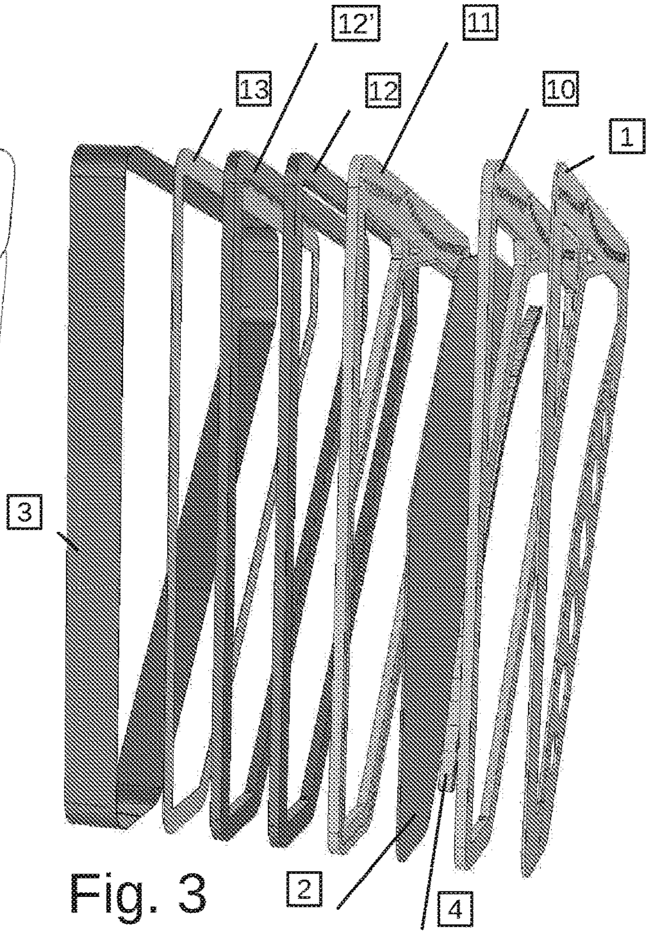
Fig. 3

TRANSPORTABLE STRINGED KEYBOARD INSTRUMENT

CROSS-REFERENCE TO RELATED APPLICATIONS

This application is the U.S. national phase of, and claims priority to, International Application No. PCT/DK2021/050032, filed Feb. 2, 2021, which designated the U.S. and which claims priority to Danish Patent Application No. PA 2020 00128, filed Feb. 2, 2020.

BACKGROUND OF THE INVENTION

The invention relates to stringed keyboard instruments and deals more particularly with the weight and transportability of these instruments, comparing primarily with upright pianos. Despite the widespread preference of playing an acoustic piano rather than a digital piano, the sales numbers for digital pianos are significantly higher. This has a lot to do with 1) affordability, 2) portability and 3) space requirements. The present invention aims to offer these three advantages, among others, in combination with providing an acoustic sound comparable to the sound of prior art within the field of acoustic pianos.

The weight of prior art instruments is mostly due to a sound-body with a cast metal front plate and a back frame made of massive wood bars that prevent bending of the front plate. U.S. Pat. No. 4,377,102A describes the use of a sandwich construction in a lightweight piano string frame, to replace the cast iron front plate. This solution requires a soundboard with a very high bridge or a fairly thin sandwich construction, since the bridge has to protrude through the sandwich construction to reach the strings. A possible argument for the use of heavy parts such as the cast iron frame and the wooden frame is their natural ability to reflect soundboard vibrations back into the soundboard, thus not absorbing them, mostly because of their much higher weight compared to the soundboard.

Conventional prior acoustic pianos take up a lot of space and are difficult to transport. For transportation reasons, typically only the lid or cover plates can be detached and for upright pianos there often is an option to remove the action (moving parts that connect keys to hammerheads including hammerheads) as well. These parts account for a small fraction of the total weight, typically starting at 170 kg, leaving the piano an almost immovable object for non professionals. With increasingly urban and flexible lifestyles, a more flexible handling of an acoustic piano would be beneficial.

For transportation reasons, some prior art offers the option of separate transportation of the keyboard and action as a separate unit, but leaves the user with a still rather bulky sub-unit to transport.

Acoustic pianos of the prior art typically take up a large amount of space. Upright pianos score best with respect to consuming as little space as possible, but still have a considerable depth, usually starting from 0.6 meter.

Many procedures within piano manufacturing can be regarded as cost intensive. Although automation increasingly finds its way to this particular industry, sound-body assembly still comprises the separate procedures of casting along with associated machining to reach sufficient precision, welding or bonding and joining with the use of fasteners. This means a separate manufacturing or assembly of front plate, soundboard and back frame, all of which still have to be joined afterwards.

SUMMARY OF THE INVENTION

The invention relates to a transportable stringed keyboard instrument with a lightweight sound-body, said sound-body comprising a front plate constituted of a material having a modulus of elasticity between 10 GPa and 300 GPa, for example steel, with said front plate being bonded to a soundboard fixation layer constituted of a material with a hardness comparable to or higher than birch, for example having a Janka hardness of 4000 Newton or higher, with said soundboard fixation layer anchoring all ends of strings together with the front plate and any kind of pins and bushings, said soundboard fixation layer being bonded to an outer edge portion along the contour of a soundboard, allowing said soundboard to vibrate freely apart from the outer edge portion, said soundboard comprising a bridge that protrudes through the front plate and soundboard fixation layer through clearance openings in said front plate and said soundboard fixation layer to connect with the strings, with said sound-body furthermore comprising a side plate constituted of a material having a modulus of elasticity between 10 GPa and 300 GPa, for example steel, with said side plate being bonded to the sides of the front plate and/or the soundboard fixation layer.

The sound-body may furthermore comprise a rear soundboard fixation layer, one or more sandwich spacing layers and a back plate located behind all aforementioned layers including the soundboard, with the rear soundboard fixation layer being preferably constituted of a material with a hardness comparable to or higher than birch, for example having a Janka hardness of 4000 Newton or higher, bonded to either the outer edge portion along the contour of the soundboard or the soundboard fixation layer, with said rear soundboard fixation layer allowing the soundboard to vibrate freely, apart from its outer edge portion along its contour, with said rear soundboard fixation layer possibly joined with any amount of additional sandwich spacing layers preferably constituted of a material of density comparable to poplar or lower, capable of prohibiting relative movement between front plate and back plate, with said back plate being constituted of a material comparable to the front plate, preferably thinner than said front plate and dimensioned with a minimal amount of material located behind the outer edge portion of the soundboard to reach an optimal sandwich principle effect together with the front plate, to optimize bending resistance. The described sound-body construction is highly resistant to bending under string load due to both the sandwich construction with the use of high modulus of elasticity materials at the location of highest stresses, kept at a distance from each other by several sandwich spacing layers, along with the side plate which has an optimized orientation and moment of inertia to withstand the bending forces as well, which results in an overall more efficient use of material compared to prior art and the goal of reducing weight and increasing transportability.

A method of forming such a lightweight sound-body may comprise the use of a veneer press or similar device to bond all layers parallel to the front plate, including the bridge and the soundboard and possible ribs for the soundboard with use of negative forms or molds to put under and above the soundboard as pressure regulators, in a single press procedure, including the bonding of the side plates as soon as all layers parallel to the front plate are in place and before the veneer press pressure is released, thereby avoiding the need for welding and the use of fasteners such as bolts and screws, along with the need to machine a cast iron front plate because of the possibility to laser or CNC manufacture plate material with high accuracy. A side plate glued to the front plate and/or other plates parallel and bonded to the front plate has the advantages of maintaining the pressure on the soundboard independent of moisture and temperature swings along with reducing costs of manufacturing significantly. Another advantage is the possibility to use form plates as a shaping means on top of the front plate and under the back to form the sandwich construction to an inverse curvature with respect to the curvature that would result due to string load bending of the sound-body, which adds a possibility to use less material by allowing the structure to bend slightly under string load, so that the inverse curvature is bent to a straight form under string load. The sandwich principle including the space behind the soundboard, in combination with the use of a side plate, allows for a soundboard fixation and desired reflection of soundboard vibrations back into the soundboard by means of a rigidity based on tension rather than a rigidity based on mass.

The invention may add another possibility to reduce weight of a stringed keyboard instrument by adding an optional bridge duplex layer to the soundboard, accommodating bass strings crossing the plain strings while being connected to the same bridge as the plain strings, either bass strings or plain strings connecting to a first layer and the other type of strings connecting to a layer on top of that and bonded to the first layer, thereby creating tunnels for the strings connecting to the first layer with said tunnels allowing string vibration without touching the bridge, before and beyond two conventional bridge pins. This may add the advantage of reducing space requirements of the soundboard by avoiding the need of a separate bass bridge when crossing strings are used, which is often preferred because this allows a smooth inharmonicity transition from plain strings to bass strings. Reducing the area required by the soundboard may allow for a smaller sound-body and corresponding weight reduction.

Transportability of a stringed keyboard instrument may be benefited by a rotational connection between action and keyboard allowing the action to fold down towards the keys for transportation or storage of keyboard and action as a separate unit independent from the soundboard, with the action maintaining its position relative to the keyboard, so that when mounting the keyboard, the action is automatically positioned as well, only requiring a fixation of the rotational movement in the position of desired distance of hammerheads to strings, by means of click-, pin- or similar connection, located on either the soundboard or the keyboard. The separate transportation of keyboard and action, along with detachable legs, may thus make the heaviest part, which is the sound-body, between 15 percent and 30 percent lighter.

Further weight optimization of a stringed keyboard instrument, potentially also resulting in space reduction, may be achieved by reversing the orientation of the whippen inside an upright piano action compared to prior art, so that the upwards motion of the back side of the keys connects to the whippen behind the rotational axis of the whippen, in other words in the area between the strings and the rotational axis of the whippen, so that the keys can be positioned closer to the strings. This may reduce the depth of an upright piano by between 7 to 10 centimeters. The reverse orientation of the whippen implies additional changes to the workings of conventional upright piano actions by potentially adding a damper jack behind the hammer jack (closer to the strings) on the whippen to actuate the damper lever behind the axis of rotation of said damper lever and inversely similar to the unchanged actuation of the hammer butt, with said hammer butt having a first stage of contact with the jack for actuation and a second stage of contact with said jack for landing purposes of the hammer half way the fall back motion of the hammer, thereby omitting the need of a back-check conventionally used in upright piano actions.

A final weight reducing improvement may reside in the use of plate material with cut-outs in any form, such as triangular cut-outs, in places where sufficient strength can be reached using these cut-outs, for example inside the sound-body standing support, the legs for the keyboard and in the sandwich spacing layers inside the sound-body. These cut-outs can reduce the weight of the entire stringed keyboard instrument with up to 20 percent.

BRIEF DESCRIPTION OF THE DRAWINGS

FIG. 1 shows a plan view of a sound-body of a stringed keyboard instrument according to the embodiment of FIG. 4.

FIG. 2 shows a perspective view of the sound-body of FIG. 1.

FIG. 3 shows an exploded view of the sound-body of FIG. 1.

FIG. 15 shows an outer edge portion along the contour of a soundboard.

DETAILED DESCRIPTION OF THE INVENTION

Figure 4:
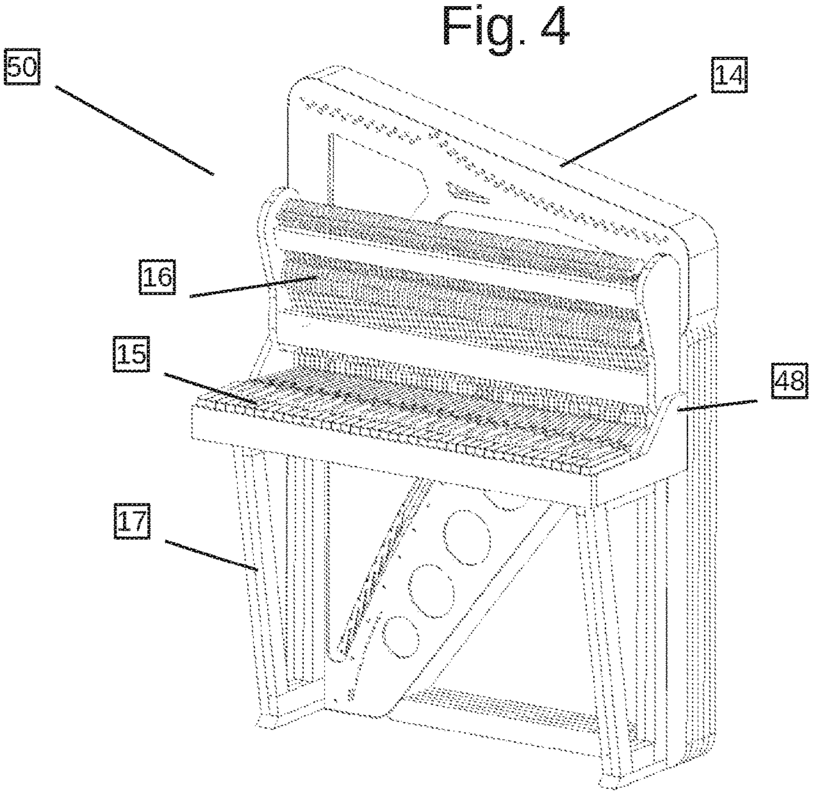
FIG. 4 shows a perspective view of a preferred embodiment of a stringed keyboard instrument, with an overview of the major components.
Figure 12:
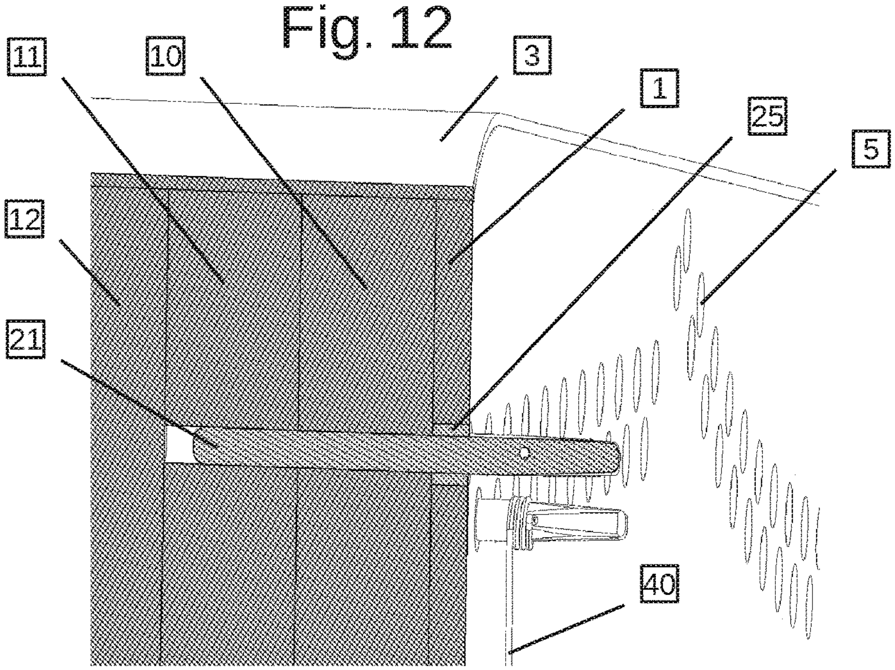
FIG. 12 shows a sectional view of an embodiment of a tuning mechanism.
Figure 13:
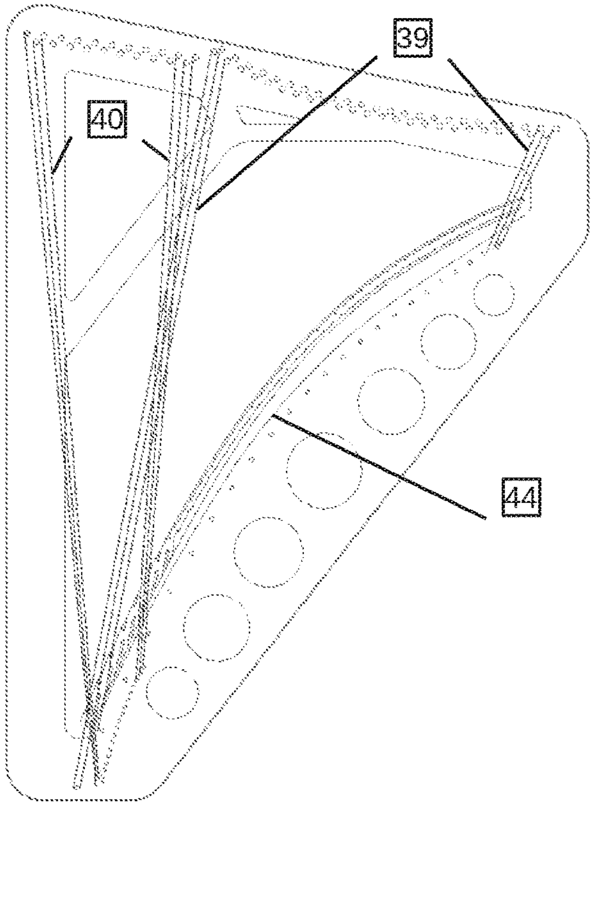
FIG. 13 illustrates crossing of strings with 3 strings illustrated at start and end of plain string section and bass section.

FIG. 4 shows an overview of the major components in an embodiment of a stringed keyboard instrument 50. FIG. 1 and FIG. 2 focus on a sound generating body called the sound-body 14, isolated from the keyboard 15, action 16 (the word action 16 denotes what is understood as the mechanical parts translating upward movement of keys into hammerheads hitting the strings, in the context of the invention meaning an upright piano action), and keyboard legs 17. Weight may be saved by restricting the dimensions of the sound-body 14 including a soundboard 2 and a frame to bear the tension of the strings, said frame comprising a front plate 1, one or two soundboard fixation layers 10 and 11, optional sandwich spacing layers 12, a back plate 13 and/or a side plate 3. Weight may be saved by dimensioning said frame according to a minimum area required by strings 39 and 40 and soundboard 2. Minimizing the soundboard area may be done with the use of a bridge that can accommodate both plain strings 39 and bass strings 40, as shown in FIG. 15, using a bridge duplex layer 18 as described later in this text. The front plate 1 has tuning pin holes 5 at the top as shown in FIG. 12, and plain string anchoring holes 6 along with bass string anchoring holes 8 at the diagonal bottom of the front plate 1. The anchoring of the bottom end of the strings may be done with a conventional press fit and downward bent pin. The top end of the strings can be inserted and wound around tuning pins 21 protruding either soundboard fixation layer 10 and rear soundboard fixation layer 11 or only soundboard fixation layer 10 in case of sufficient thickness, said layers being constituted of conventional material, preferably beech in multiple layers for each of these soundboard fixation layers, with soundboard fixation layer 10 preferably protruding the front plate 1 through tuning pin holes 5 in order to simultaneously perform the function of a tuning pin bushing 25, preferably constituted of beech as well, due to the ideal stiffness of beach fibers to provide friction with the tuning pins 21.

The strings pull at the front side of the front plate 1 (the side furthest from the soundboard 2), thereby creating a bending moment on the sound-body 14. Typically, the tension of a single string is between 600 and 1000 Newton. The conventional solution for this is the use of a cast metal frame with ribs, in combination with a heavy wooden frame behind the soundboard 2 with the main purpose of preventing bending of the cast iron frame. The invention introduces the use of a front plate 1 in combination with a back plate 13 behind the soundboard 2. The front plate 1 and back plate 13 should be made of a material with higher modulus of elasticity compared to the inner layers 10, 11 and 12, shown in FIG. 3. The suggested material for the front plate 1 and back plate 13 is steel (or any material with a modulus of elasticity between 10 GPa and 300 GPa, including beech wood, or between 60 GPa and 300 GPa with lower limit just including aluminum, or between 180 GPa until 300 GPa starting from steel, including carbon fiber composites typically around 230 GPa and including some possible improvements on fiber composites or similar materials in the future), whereas the inner layers are preferably made of wood, but may be made of other materials with shear strengths comparable to wood as well. For the soundboard fixation layers 10 and 11 a minimum hardness comparable to birch or beech wood is preferred to avoid dampening of the soundboard vibrations. The Janka scale of hardness should preferably position these materials with a value above 4000 Newton. These layers have the function of soundboard fixation, by bonding with the outer edge portion along the contour 43 of the soundboard 2, thus leaving the rest of the soundboard 2, the soundboard vibration area 49, inside of the outer edge portion along the contour 43, free to vibrate according to the vibrations of the strings 39 and 40 being transferred to one or more bridges 4 protruding from one or more clearance openings 44 to allow the bridges 4 to protrude through the soundboard fixation layer 10 and the front plate 1 in order to connect to the strings 39 and 40. The soundboard vibrations should be reflected as much as possible by the soundboard fixation layers 10 and 11, so that the vibrations remain in the soundboard, thereby maximizing the sustain of the tone, hence the required hardness. FIG. 3 shows two sandwich spacing layers 12 and 12' which have the sole purpose of making the sound-body thicker, so that the back plate 13 can be further away from the front plate 1. This increases the moment of inertia of the combination of these two structural elements and their ability to resist bending, as the front plate 1 and back plate 13 together form a sandwich construction. A suggested material for sandwich spacing layers 12 would be poplar wood or any kind of material that can prevent the front plate 1 and back plate 13 to move relative to each other in combination with a lower density compared to beech wood.

In conventional stringed keyboard instruments, the reflection of soundboard vibrations back to the soundboard 2 is primarily accomplished with the help of mass. The cast iron frame and heavy wood frame account for a structure which is basically so heavy that it automatically reflects the soundboard vibrations back into the soundboard 2. The invention proposes the bonding of a side plate 3, to minimize deflection of soundboard fixation layers 10 and 11, additional to but independent of a sandwich principle, thereby helping to maintain vibrational energy there where it is needed for sound generation, by reflecting vibrations back to the soundboard 2 and thereby assuring sufficient sustain of the sound.

Both the extended sandwich principle and side plate 3 replace the conventional rigidity offered by the mass of a cast iron frame together with a woodframe behind the soundboard with a rigidity based on tension and geometry optimization rather than mass, as a means to avoid dampening of the soundboard vibrations and to withstand string load.

The side plate 3 furthermore adds the benefit of maintaining pressure on the soundboard fixation layers 10 and 11, present during the bonding process with use of a veneer press or similar device, independent of moisture content and without the use of fasteners. The entire sound-body can be bonded in a single press procedure by use of a veneer press or similar device, so that possible ribs for the soundboard 2, often present in conventional soundboards made of spruce, along with one or more bridges 4, do not need a separate bonding procedure, using customized support molds or negative forms that can guarantee the correct pressure on the soundboard 2 parts. During the curing of adhesives for all layers parallel to the front plate 1, the side plate 3 can be bonded to the sides of one or more layers parallel to the front plate 1 and/or said front plate itself, thereby helping to maintain the distance between all layers and the pressure on the soundboard fixation layers. The use of a strap going all the way around the sound-body 14 and customized blocks to put between the strap and the side plate 3 to strategically distribute pressure may allow for a simple method to bond the side plate while the other layers are under pressure by a veneer press or similar device. For wood bonding, traditional wood glue can be used and for metal-wood bonding or any material in combination with wood several appropriate epoxies exist, for which a low flexibility in dry state would be preferable to avoid absorption of vibrations. Great care must be spent on assuring that all layers are bonded to each other at the contact areas to secure the workings of the sandwich principle. The side plate 3 adds to securing this, but it should be noted that the use of a side plate 3 and a back plate 13 can be independent from each other. An additional advantage of a single press procedure is that form plates or slightly convex molds as could be used a shaping means to put under all layers parallel to the front plate along with a corresponding concave mold or form plate on top of the front plate, so that all layers are slightly bent inversely compared to the bending direction as a result of the string tension. This "negative pre-bending" can be dimensioned so that the actual bending due to the tension of the strings pulls the sound-body straight. All layers can be positioned with pin connections between the layers, so that if cut by laser or computer numerically controlled (CNC) routers, the plates will be positioned automatically and with high precision. If bonding agents that dry quickly are used, the veneer press can close and reopen between several episodes of layer positioning in the press.

The bass string anchoring holes 8 are separate from the plain string anchoring holes 6 in this particular embodiment due to the bass strings 40 crossing the plain strings 39 and thus needing to be slightly elevated to avoid string contact. It should be noted that the bass strings can be next to the plain strings, without crossing, this being a matter of taste (crossing strings allow longer plain strings 39 in restricted area and a smoother inharmonicity transition between plain strings 39 and bass strings 40). The exact shape and size of the soundboard, together with the shortest distance of the bridge 4 to the fixation of the soundboard 2 at its outer edge portion along the contour 43, all have great influence on the sound character, being a matter of taste as well. Defining a minimum area for the soundboard 2 is therefor not within the scope of the invention.

Figure 5:
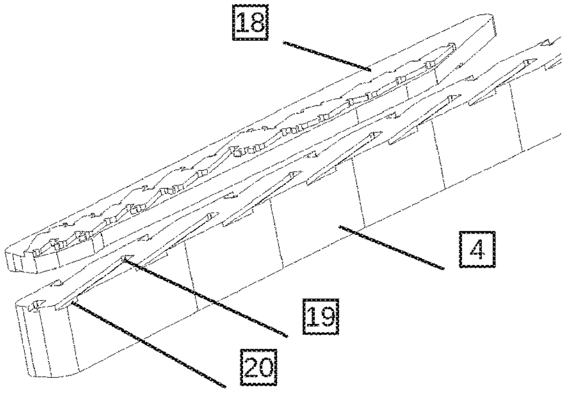
FIG. 5 shows an exploded view of a duplex bridge.

The soundboard 2 is connected to the strings (39, 40), to amplify the vibrations of the strings, by means of one or more bridges 4. In the case that crossing strings are favored, the soundboard area can be kept smaller by using only one bridge instead of a separate bridge for the bass strings, as shown in FIGS. 5 and 15, by adding a bridge duplex layer 18 on the bridge 4 bonded to the soundboard 2 to connect the bass strings 40 to the soundboard 2 by means of the same bridge 4 used by the plain strings 39. A channel 20 to avoid contact of the plain strings 39 and bridge 4 beyond or before the bridge pin holes 19 (with use of conventional bridge pins) leaves the rest of the top surface of the bridge 4 for bonding with the bridge duplex layer 18. Corresponding channels for string (39, 40) and bridge 4 contact avoidance need to be provided at the bottom side (pointing towards the bridge 4) of the duplex layer 18 as well. It should be noted that the depicted embodiment has the bass strings 40 crossing the plain strings 39 by being located further away from the front plate, and that this might as well be the other way around. The advantage of having the bass strings 40 "on top" (further away from the front plate) is that the plain strings are easier to navigate through the channels when a single piece of string wire is used for two tuning pins 21 (turning around the plain string anchoring holes and their corresponding conventional hitch pins).

The sound of the embodiment 50 is provided by the soundboard 2 that amplifies the vibrations of the strings (39, 40), coming from the impact of the hammerheads 37 hitting the strings (39, 40). Cover structures can of course also be used with the depicted embodiment of the invention. The use of textile in combination with a wooden frame for example may provide the needed protection while remaining lightweight.

Figure 6:
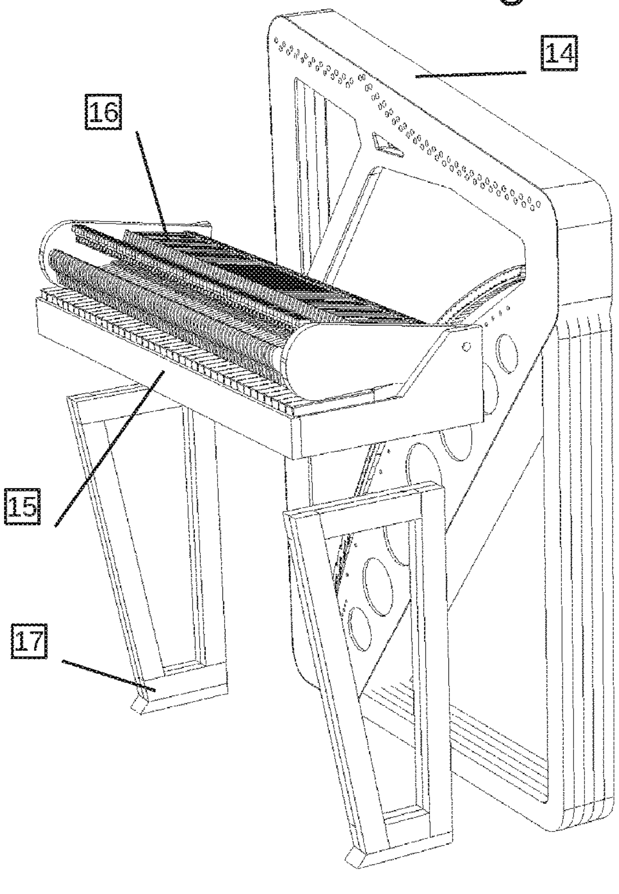
FIG. 6 illustrates a separate transportation option of keyboard legs and keyboard and action assembly.
Figure 7:
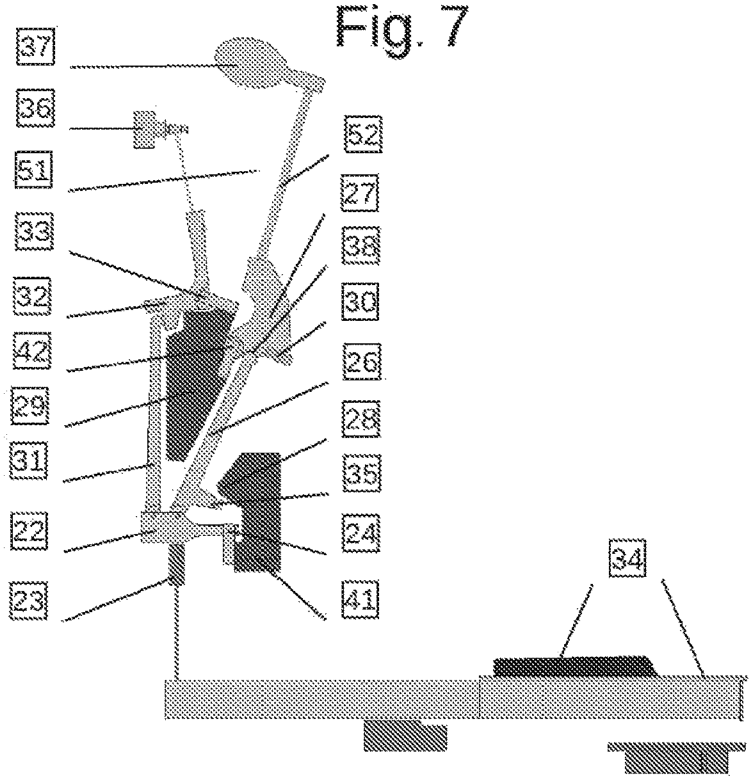
FIG. 7 shows a sectional view embodiment of an upright piano action including keys.

To further optimize the comfort of transporting the stringed keyboard instrument, the invention suggests folding down the action 16, thereby also allowing access to the action regulation screws on the rear side of the second action bar 41 (the side nearest to the strings) without the need to disassemble or "take out" the action as required in conventional upright pianos. The keyboard 15 and action 16 thus form a subunit, independent of the sound-body 14, thus significantly reducing the weight of the heaviest part to carry, as shown in FIG. 6. The action 16 can fold towards the keyboard 15 by means of a rotary connection 21, only allowing rotation. This means that positioning the keyboard 15 on the keyboard legs 17 automatically secures the position of the action 16, which can be either folded down (for transportation), or upright (for playing), secured to either of these positions by means of conventional locking or "clicking systems" between respectively action 16 and keyboard 15 or action 16 and sound body 14. A cover for this separate unit (keyboard 15 and action 16), covering mostly the action parts, may be detachable, so that the same cover can be mounted in operational and in transport mode (thus being mountable on both sides of the action 16). The keyboard legs 17 can be made so that they click into the sound-body 14 according to conventional methods, to secure a more stable posture of the sound-body with a single twist of one hand, while holding the sound-body with the other hand.

Reduction of space requirement of the keys 34 and the overall depth of the instrument make the instrument more lightweight. FIGS. 7 to 11 show an embodiment of an action with a whippen 22 being pushed upwards by a pilot 23 in the area between a whippen hinge 24 (or axis of rotation) and the strings (39, 40), allowing a position of the keys 7 to 10 cm closer to the strings, compared to conventional upright pianos. The actuation of the dampers 25 mounted to the action bar 29 is performed by a damper jack 31 mounted on the whippen, next to a hammer jack 26. A damper lever 32 is pushed up by the damper jack 31 in the area between a damper hinge 33 and the strings (39, 40), resulting in a damper head 36 being pulled back and thereby leaving the string (39, 40) free to vibrate. When a key 34 is pressed, the hammer jack 26 pushes up a hammer butt 27. A let-off button 28 deviating the hammer jack 26 by blocking the let-off arm 35 of said hammer jack 26 (let-off meaning "no longer pushing the hammer butt") right before a hammerhead 37 hits a string (39, 40), prevents the hammer 51 from continuously being pushed against the string (39, 40) as long as the key 34 is pressed, which would dampen the sound. What is meant with the hammer 51 is the combination of the hammer butt 27, a hammer rod 52 and the hammerhead 37. The let-off button 28 is part of the second action bar 41 to which the whippen 22 is bolted or screwed, either by a solid edge integrated in the second action bar 41 or by adjustable buttons that can be positioned on a threaded wire through the second action bar 41. The deviation (or let-off) of the hammer jack 26 allows the hammer 51 to fall back, since otherwise the hammer jack 26 would continue to press the hammer butt 27 as long as the key is pressed.

Figure 11:
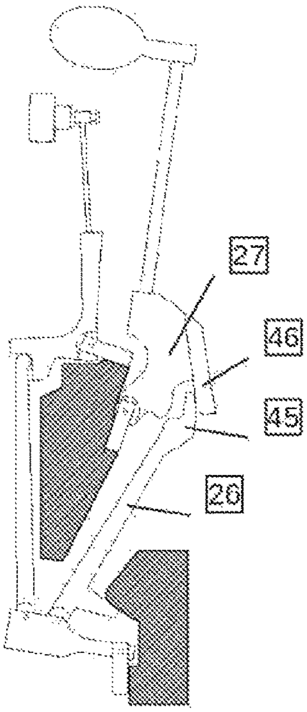
FIG. 11 shows a slightly different method for the action of FIG. 7 to perform back-check at hammer return compared to FIG. 10.
Figure 8:
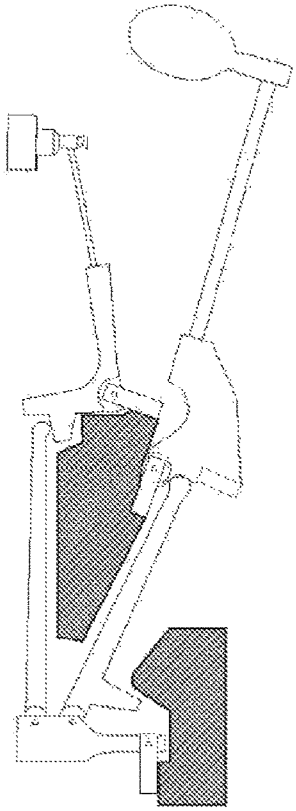
FIGS. 8 to 10 show 3 different positions of the action of FIG. 7: key unpressed (FIG. 8), key pressed hammer hitting string (FIG. 9) key still pressed and hammer caught by jack (FIG. 10).
Figure 9:
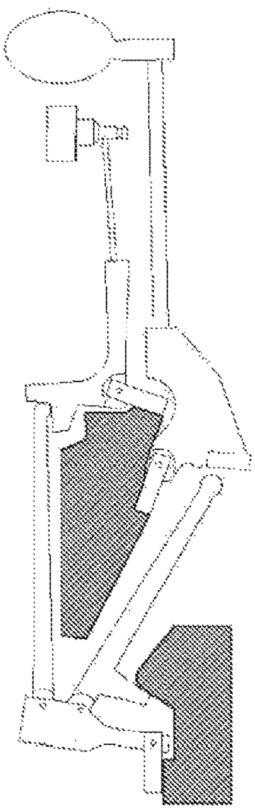
Figure 10:
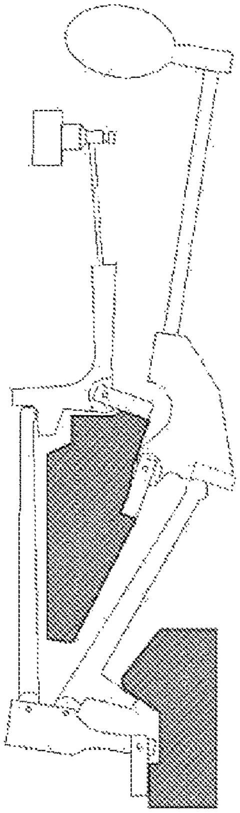

It is beneficial to catch the hammer 51 at some point on its way back from hitting the string and before the starting position, so that when the key 34 is released, the quicker falling whippen 22 allows the hammer jack 26 to fall back in place under the hammer butt 27, ready for a new hammer 51 strike. This can be done with a second stage 30 as part of the hammer butt 27, somewhat further away from the top of the hammer jack 26 (closest to the hammer butt 27) compared to a first stage 38 of the hammer butt 27, which is used to stop the hammer from falling all the way back while the key is still pressed. This second stage 30 should have a material with kinetic dampening properties, to have the hammer butt 27 rest on top of the hammer jack 26 until the key is released. This allows the hammer jack 26 to fall to position under the hammer butt first stage 38 more easily. When the key 34 is released, the whippen 22 falls back quicker than then hammer 51, due to the hammer 51 having its weight on top of the hammer hinge 42, compared to the whippen 22 having its weight next to whippen hinge 24, allowing more gravitational acceleration. To help the hammer 51 fall back, a chord can be used to connect the hammer jack 26 and the hammer butt 27. An alternative to the method described of catching the hammer 51 is shown in FIG. 11, where the hammer jack 26 has a modified jack top 45 and a modified hammer butt 27 with modified second stage 46 coming in contact with the modified jack top 45 when the hammer 51 falls, providing more area to spread the impact of the hammer butt 27 on the modified jack top 45, said second stage 46 possibly as a separate and adjustable part of the hammer butt 27.

The damper jack 31 may be timed to touch the damper lever 32 halfway the travel of the hammerhead 37 towards the string. All timing and positioning of the proposed action parts may be regulated with conventional piano action springs.

The principles of the depicted embodiment of a transportable keyboard instrument 50 apply to any kind of stringed keyboard instrument. The depicted preferred embodiment of a transportable keyboard instrument 50 has only 1 string (39, 40) per key 34, can weigh as little as 40 kg in total with a string tension of more than 600 Newton per string (39, 40) and is only one meter wide, accommodating 69 standard sized keys 34 from the note E to C. The use of one string (39, 40) per 34 key allows a very light sound-body 14 and being one meter wide allows transportation in normal cars. The use of the sandwich construction and/or side plate 3 allows thicknesses of front plate 1 of 6 mm or less and a back plate 13 and side plate 3 of as little as 1 mm thick, when for example steel is used. Using the described techniques, also stringed keyboard instruments with conventional amounts of strings (39, 40) and anchoring locations as well as any amount of keys 34 can be made significantly lighter and more transportable.

In another embodiment, for example the rotational connection 48 of the action 16 to the keyboard 14 can be part of a stringed keyboard instrument, without other elements of the present invention being a part of the embodiment. In yet another embodiment, the front plate 1, the soundboard fixation layers (10, 11) and the back plate 13 may be found without the use of a side plate and/or sandwich spacing layers 12. In yet another embodiment only the front plate 1 and the soundboard fixation layer 10 may be present, without any of the other parts described in the invention. In yet another embodiment the action 14 may have a whippen 22 being pushed upwards in the area between between the strings (39, 40) and the whippen hinge 24, without any other part described in the invention. In yet another embodiment the described whippen 22 may be accompanied by a damper jack 31 as described in the invention, without the presence of any other part described in the invention. In yet another embodiment the described whippen 22 can be accompanied by a hammer jack 26 and a hammer butt 27 as described in the invention, without the presence of any other part described in the invention. In yet another embodiment, the rotational connection 48 may be present in combination with the whippen 22 being pushed up in the area between strings (39, 40) and the whippen hinge 24, without the presence of any other part described in the invention. In general, elements within the sound-body 14 can exist independent of each other, so that if one of the elements is sufficient to meet the weight and strength requirements, another element may not be necessary, as well as the use of the rotational connection 48 can exist without the use of a lightweight sound-body 14, as a well as the whippen 22 being pushed upwards in the are between strings (39, 40) and whippen hinge 24 can exist in combination with the rotational connection 48 and/or sound-body 14 or without any other element described in the invention.

Figure 14:
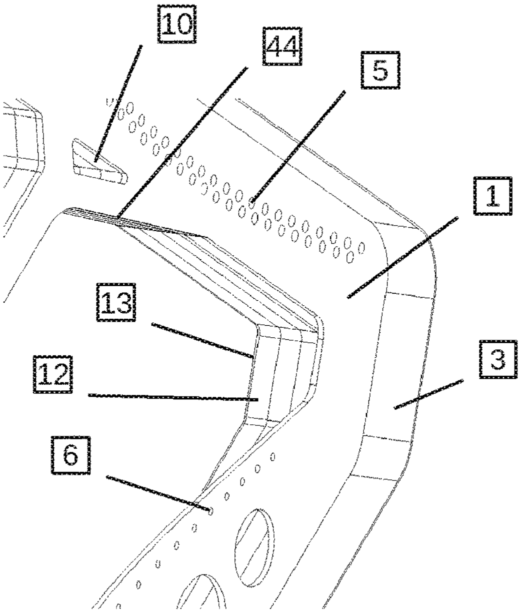
FIG. 14 shows the option of a side plate extending beyond front plate.

Further options that should be brought under attention are the option to continue the side plate 3 beyond the front plate (further away from the soundboard), as shown in FIG. 14.

Figure 16:
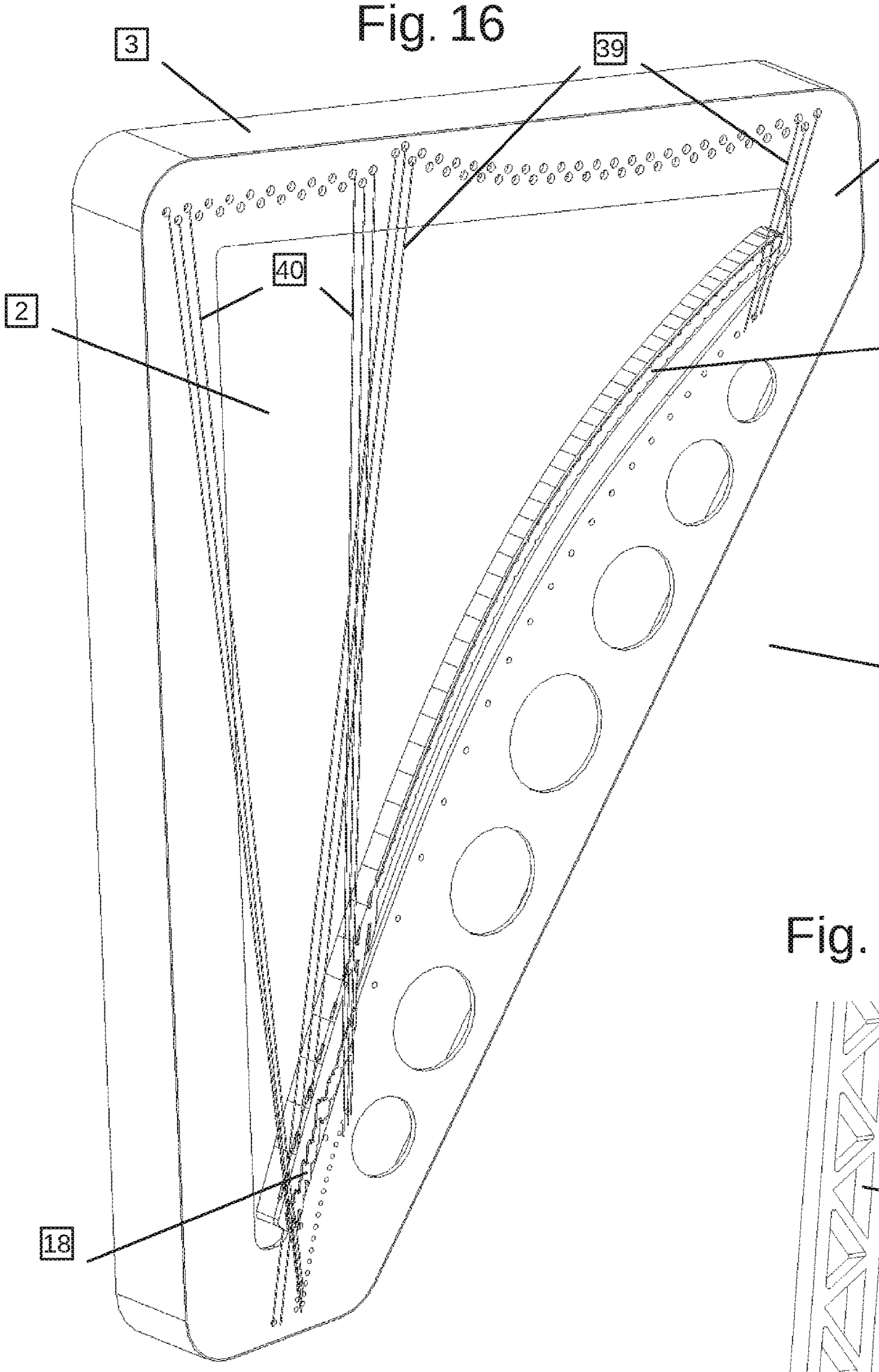
FIG. 16 shows the option of a soundboard filling up the entire area under the strings in a sound-body.

The soundboard contour does not have to be constrained by a structural reinforcement diagonal beam 47 connecting the frame area of tuning pin holes 5 with the longest side of the frame, as the soundboard 2 can also fill the entire area covered by the front plate 1, as shown in FIG. 16.

Figure 17:
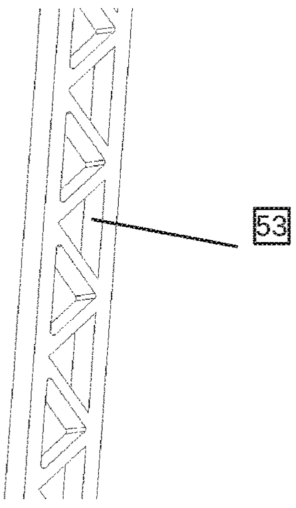
FIG. 17 shows a method of weight reduction using plate material and cut-outs.

Cut-outs like shown in FIG. 17 can be used for weight reduction of a sound-body standing aid 9 or for keyboard legs 17 or any other part of the instrument that needs weight optimization. These cut-outs can be of any form, like round or rectangular and preferably they will be triangular cut-outs 53. Also, front plate cut-outs 7 are worth mentioning and can have any shape.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the disclosure.

The invention claimed is:

1. A sound-body for a stringed keyboard instrument, comprising:

- a front plate having at least one opening;
- at least one soundboard fixation layer having at least one opening;
- a soundboard comprising a bridge that protrudes from the front plate and soundboard fixation layer through the respective at least one opening in the front face and the soundboard fixation layer;
- a side plate;
- a rear soundboard fixation layer;
- one or more sandwich spacing layers; and
- a back plate located further from the front plate compared to the soundboard fixation layer, the soundboard, the rear soundboard fixation layer, and the one or more sandwich spacing layers;
- wherein:
  - the front plate is bonded to the at least one soundboard fixation layer;
  - ends of strings are anchored to the front plate;
  - the soundboard fixation layer is bonded to an outer edge portion along a contour of the soundboard, allowing the soundboard to vibrate freely apart from the outer edge portion along the contour;
  - the rear soundboard fixation layer is bonded to the soundboard outer layer along the contour or to the soundboard fixation layer;
  - the rear soundboard fixation layer allows the soundboard to vibrate freely, apart from its outer edge portion along the contour;
  - the bridge is connected with the strings; and
  - the side plate is bonded to sides of the front plate and/or sides of the at least one soundboard fixation layer.

2. The sound-body according to claim 1, wherein:

the soundboard comprises a bridge duplex layer having bridge pins, the bridge duplex layer being configured to accommodate bass strings crossing plain strings while being connected to the bridge;

one of the bass strings and the plain strings connect to a first layer of the bridge and the other of the base strings and the plain strings connect to the bridge duplex layer on top of and bonded to the first layer, thereby creating channels for the bass strings or the plain strings that connect to the first layer;

the channels allow vibration of the strings without touching the bridge layers apart from the area between bridge pins.

3. A stringed keyboard instrument incorporating the sound-body of claim 1, wherein the instrument further comprises:

an action; and a keyboard comprising a plurality of keys, the keyboard being operably coupled to the action via a rotational connection which allows the action to fold down towards the keys of the keyboard for transportation or storage of the keyboard and the action as a separate unit independent from the sound-body;

wherein the action maintains its position relative to the keyboard whereby positioning the keyboard with respect to the sound-body for playing conditions automatically positions the action wherein the action is fixed to the keyboard in a desired position by means of one or more connections located on the sound-body and/or the keyboard.

4. The stringed keyboard instrument according to claim 3, wherein the action comprises a whippen, with a hinge of the whippen located in such a way that a pilot of a key of the plurality of keys pushes the whippen upwards when the key is pressed downwards, with the pilot located between a front plate and the hinge of the whippen so that the distance between pilots and strings is minimized.

5. The stringed keyboard instrument according to claim 4, wherein:

the action further comprises a damper jack and a hammer butt;

the damper jack is closer to the strings compared to a hammer jack;

the damper jack and the hammer jack are mounted to the whippen by means of a hinge being connected to both damper jack and hammer jack, the damper jack being for actuating a damper lever in the area between the strings and an axis of rotation of said damper lever;

the hammer butt has a first stage of contact with the hammer jack in order to be pushed up by the hammer jack, whereby a hammerhead can hit a string, along with a possible second stage of contact with the hammer jack for being held in a position at approximately half of the fall back motion of the hammer as long as a key is pressed, without the hammer being continuously pushed against a string.

6. A method of manufacturing a sound-body as claimed in claim 1, the method comprising single press bonding two or more layers of the sound-body, the layers lying in parallel with the front plate.

7. The method according to claim 6, wherein form plates are used as a shaping means on top of the front plate and under the back plate to form a sandwich construction according to an inverse curvature with respect to a curvature resulting from a string load bending of the sound-body, whereby the inverse curvature is potentially bent to a straight form under string load.

8. The stringed keyboard instrument according to claim 3, further comprising cut-outs in one or more of the front plate, the soundboard fixation layer, the soundboard, the bridge, the side plate, the rear soundboard fixation layer, the one or more sandwich spacing layers, the back plate, the action, and the keyboard to reduce the overall weight of the instrument.

9. The stringed keyboard instrument according to claim 3, wherein the stringed instrument is an upright piano.

10. The sound-body according to claim 1, wherein the front plate is constituted of a material having a modulus of elasticity between 10 GPa and 300 GPa.

11. The sound-body according to claim 1, wherein the soundboard fixation layer is constituted of a material with a Janka hardness of 4000 Newton or higher.

12. The sound-body according to claim 1, wherein the side plate is constituted of a material having a modulus of elasticity between 10 GPa and 300 GPa.

13. The sound-body according to claim 1, wherein:

the rear soundboard fixation layer is joined with a sandwich spacing layer, and the sandwich spacing layer is joined to one or more additional sandwich spacing layers.

14. The sound-body according to claim 1, wherein the back plate is constituted of a material having a modulus of elasticity between 10 Gpa and 300 GPa.

15. The sound-body according to claim 1, wherein the back plate is thinner than the front plate and is made of a plurality of parts that together cover at least an area equivalent to the outer edge portion along the contour of the soundboard and the front plate.

16. The sound-body according to claim 15, wherein the sandwich spacing layer is constituted of a material of density substantially equal to or lower than that of poplar and a shear strength substantially equal to or higher than that of poplar.

17. The stringed keyboard instrument according to claim 5, wherein the hammer jack has a chord attached to it and to the hammer butt to increase a falling speed of the hammer butt.

18. The method according to claim 6, further comprising:

bonding the side plate while all layers parallel to the front plate are in place, wherein the layers parallel to the front plate are still under bonding pressure to secure solid fixation of the soundboard.

19. The method according to claim 6, wherein the bonding step is completed using one or more molds and/or negative forms.

* * * * *